Patented Mar. 5, 1929.

1,704,660

UNITED STATES PATENT OFFICE.

OTTO EISLEB, OF HOFHEIM-ON-THE-TAUNUS, GERMANY, ASSIGNOR, BY MESNE ASSIGNMENTS, TO WINTHROP CHEMICAL COMPANY, OF NEW YORK, N. Y., A CORPORATION OF NEW YORK.

ALKAMINESTERS OF THE ORTHO-AMINOBENZOIC ACIDS AND PROCESS OF MAKING SAME.

No Drawing. Application filed October 11, 1926, Serial No. 141,037, and in Germany October 28, 1925.

My present invention relates to the preparation of alkamine esters of certain derivatives of o-aminobenzoic acid.

In U. S. P. No. 1,550,350 of August 18, 1925 are described alkamine esters of N-monoalkylated and N-monoalkoxyalkylated derivatives of para-aminobenzoic acid, which are obtained by esterifying, by one of the usual methods, para-N-monoalkyl- or para-N-monoalkyloxyalkylaminobenzoic acids, other than para-N-monomethyl- and para-N-monoethyl-aminobenzoic acid by means of amino alcohols or by treating alkamine esters of para-aminobenzoic acid with such alkylating or alkoxyalkylating agents as contain alkyl residues or alkoxyalkyl residues having more than 2 carbon atoms.

Now I have found that alkamine esters are obtained, which are by far superior to cocaine as regards their power of producing surface anaesthesia and entirely equal to the compounds obtainable by the aforesaid U. S. Patent, by esterifying o-N-alkyl- or o-N-alkyloxyalkyl-aminobenzoic acid with an amino alcohol by one of the usual methods, or by treating an alkamine ester of o-aminobenzoic acid with alkylating or alkoxyalkylating agents.

The new compounds correspond to the formula:

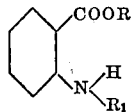

in which R stands for an alkamine residue and R$_1$ for an alkyl- or alkyloxyalkyl residue. The products may be obtained by replacing in o-aminobenzoic acid in any desired order, the hydrogen atom of the carboxyl group by an alkamine residue and by further replacing a hydrogen atom of the amino group by an alkyl- or alkyloxyalkyl residue and then converting the bases thus obtained into their water-soluble salts. This remarkable efficacy of the alkamine esters obtainable by my new process could not be foreseen, because the anaesthetising capability of the o-aminobenzoic acid alkamine ester is very often distinctly inferior to that of the para-aminobenzoic acid alkamine esters, but the former possess a higher toxicity than the latter.

The following example serves to illustrate my invention, but is not intended to limit it thereto:

Preparation of N-β-methoxyethylanthranilic acid-β-piperidino-ethylester:

N-β-methoxyethylanthranilic acid is produced by boiling an aqueous solution of sodium anthranilate with β-chlor-ethylmethylether; this acid is practically insoluble in water and has a melting point of 102° C. By esterifying the said acid with ethyl alcohol it yields N-β-methoxyethylanthranilic acid ethylester, an oil boiling under 8 mm. at 160–165° C. N-β-methoxyethylanthranilic acid ethylester, β-piperidino-ethanol and a small quantity of sodium ethylate as catalyst, are heated together so that the ethyl alcohol which splits off distills over. The residual product of the reaction is dissolved in alcohol and mixed, while cooling, with alcoholic hydrochloric acid until there is a neutral reaction. On adding ether, the monohydrochloride of methoxyethylanthranilic acid piperidino-ethylester separates as an oil which soon solidifies. This compound, when recrystallized from acetic ester, forms a colorless crystalline powder, the melting point of which is 118° C. Its solution in water shows a blue fluorescence.

The new compound has the formula:

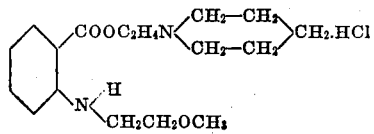

I claim:
1. The process for preparing alkamine esters of the o-aminobenzoic acids monosubstituted at the nitrogen having the formula:

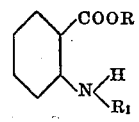

wherein R stands for an alkamine residue and R$_1$ for an alkyl- or alkyloxyalkyl residue, which consists in substituting in o-aminobenzoic acid in any desired order for the hydrogen atom of the carboxyl group an alkamine residue and for a hydrogen atom of the amino group an alkyl- or an alkyloxyalkyl residue and then converting the bases so obtained into their water soluble salts.

2. The process for preparing o-N-methoxyethylaminobenzoic acid alkamine ester, which consists in substituting in o-aminobenzoic acid, in any desired order, for the hydrogen atom of the carboxyl group an alkamine residue and for a hydrogen atom of the amino group the methoxy-ethyl residue, and then converting the bases so obtained into their water soluble salts.

3. The process for preparing o-N-alkylaminobenzoic acid piperidino-ethylester, which consists in substituting in o-aminobenzoic acid, in any desired order, for the hydrogen atom of the carboxyl group the piperidino-ethyl residue and for a hydrogen atom of the amino group an alkyl- or alkyloxyalkyl residue, and then converting the bases so obtained into their water soluble salts.

4. The process for preparing o-N-methoxyethylaminobenzoic acid piperidino-ethylester, which consists in substituting in o-aminobenzoic acid, in any desired order, for the hydrogen atom of the carboxyl group the piperidino-ethyl residue and for a hydrogen atom of the amino group the methoxyethyl residue, and then converting the base so obtained into its water soluble salts.

5. The process for preparing o-N-methoxyethylaminobenzoic acid piperidino-ethylester, which consists in substituting in o-aminobenzoic acid, in any desired order, for the hydrogen atom of the carboxyl group the piperidino-ethyl residue and for a hydrogen atom of the amino group the methoxyethyl residue, and then converting the base so obtained into its hydrochloric acid salt.

6. As new products, the compounds of the formula:

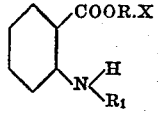

wherein R stands for an alkamine residue, $R_1$ for an alkyl- or alkyloxyalkyl residue and X for an acid which renders the compounds water soluble.

7. As new products, the compounds of the formula:

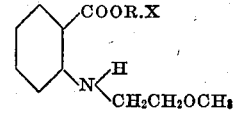

wherein R stands for an alkamine residue and X for an acid which renders the compounds water soluble.

8. As new products, the compounds of the formula:

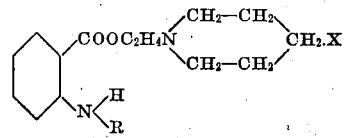

wherein R stands for an alkyl- or alkyloxyalkyl residue, X for an acid which renders the compounds water soluble.

9. As new products, the compounds of the formula:

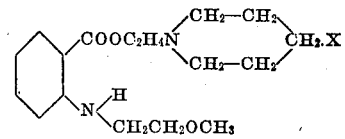

wherein X stands for an acid which renders the compounds water soluble.

10. As a new product, the compound of the formula:

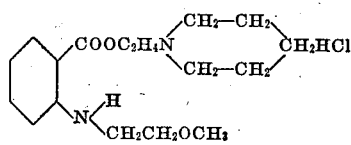

In testimony whereof, I affix my signature.

OTTO EISLEB.